US009800168B2

(12) United States Patent
Zou et al.

(10) Patent No.: US 9,800,168 B2
(45) Date of Patent: Oct. 24, 2017

(54) INVERTER POWER SUPPLY SYSTEM (71) Applicant: Huawei Technologies Co., Ltd., Shenzhen (CN)

(72) Inventors: Jianlong Zou, Shenzhen (CN); Xianghui Liang, Shenzhen (CN); Yongqiao Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/980,441

(22) Filed: Dec. 28, 2015

(65) Prior Publication Data
US 2016/0111968 A1  Apr. 21, 2016

Related U.S. Application Data (63) Continuation of application No. PCT/CN2015/072551, filed on Feb. 9, 2015.

(30) Foreign Application Priority Data

Jun. 18, 2014  (CN) .......................... 2014 1 0272694

(51) Int. Cl.
*H02M 5/458*  (2006.01)
*H02M 5/42*   (2006.01)
(Continued)

(52) U.S. Cl.
CPC .......... *H02M 5/458* (2013.01); *H02M 5/4585* (2013.01); *H02M 1/32* (2013.01);
(Continued)

(58) Field of Classification Search
CPC ...... H02M 5/458; H02M 5/4585; H02M 5/42; H02M 2001/0019; H02M 2001/0025
See application file for complete search history.

(56) References Cited

U.S. PATENT DOCUMENTS 6,269,010 B1 *  7/2001  Ma ...................... H02M 5/4505
                                                    363/138
8,009,450 B2 *  8/2011  Royak .................. H02M 7/219
                                                    363/84
(Continued)

FOREIGN PATENT DOCUMENTS

CN        1744421 A      3/2006
CN      104079182 A     10/2014
(Continued)

OTHER PUBLICATIONS

Ma, J., et al., "A Space Vector Modulated CSI-based ac Drive for Multi-motor Applications," Applied Power Electronics Conference and Exposition, Mar. 14, 1999, pp. 800-806.
(Continued)

*Primary Examiner* — Timothy J Dole
*Assistant Examiner* — Sisay G Tiku
(74) *Attorney, Agent, or Firm* — Conley Rose, P.C.

(57) ABSTRACT

An inverter power supply system includes an inverter circuit and a feedback circuit, where the inverter circuit is configured to convert a first alternating current voltage into a second alternating current voltage, and convert a first alternating current into a second alternating current; the feedback circuit determines whether a value of the second alternating current voltage exceeds a preset threshold; and when the value of the second alternating current voltage exceeds the preset threshold, the feedback circuit acquires a feedback current, compensates for a reference value of the first alternating current according to the feedback current, generates a control signal according to a reference value, after compensation, of the first alternating current, and outputs the control signal to the inverter circuit to adjust the value of the second alternating current voltage.

20 Claims, 4 Drawing Sheets

(51) Int. Cl.
  *H02M 1/00* (2006.01)
  *H02M 1/32* (2007.01)
(52) U.S. Cl.
  CPC ............... *H02M 2001/0019* (2013.01); *H02M 2001/0025* (2013.01)

(56) References Cited

U.S. PATENT DOCUMENTS

| | | | | |
|---|---|---|---|---|
| 8,693,229 | B2* | 4/2014 | Saeki | H02M 7/68 363/40 |
| 9,203,298 | B2* | 12/2015 | Wang | H02M 1/126 |
| 9,389,263 | B2* | 7/2016 | Sartler | G01R 31/028 |
| 9,490,690 | B2* | 11/2016 | Bhandarkar | H02M 7/219 |
| 9,490,738 | B2* | 11/2016 | Nondahl | H02P 27/08 |
| 2003/0223251 | A1 | 12/2003 | Hammond | |
| 2006/0044848 | A1 | 3/2006 | Suzuki et al. | |
| 2007/0070660 | A1* | 3/2007 | Tallam | H02P 21/16 363/44 |
| 2008/0130335 | A1* | 6/2008 | Yuzurihara | H02M 7/125 363/125 |
| 2008/0180055 | A1* | 7/2008 | Zargari | H02M 1/4216 318/729 |
| 2009/0128083 | A1* | 5/2009 | Zargari | H02M 5/4585 318/801 |
| 2010/0080028 | A1* | 4/2010 | Cheng | H02M 5/4585 363/126 |
| 2010/0142234 | A1 | 6/2010 | Abolhassani et al. | |
| 2011/0292696 | A1* | 12/2011 | Xiao | H02M 1/32 363/37 |
| 2013/0057297 | A1* | 3/2013 | Cheng | H02M 1/32 324/548 |
| 2013/0214708 | A1* | 8/2013 | Saeki | H02M 5/4585 318/376 |
| 2013/0279214 | A1* | 10/2013 | Takase | H02M 7/68 363/37 |
| 2013/0286692 | A1* | 10/2013 | Patel | H02M 1/32 363/37 |
| 2014/0112034 | A1* | 4/2014 | Wang | H02M 1/126 363/48 |
| 2015/0092460 | A1* | 4/2015 | Tallam | H02M 7/125 363/44 |
| 2015/0241503 | A1* | 8/2015 | Bhandarkar | G01R 31/028 363/44 |

FOREIGN PATENT DOCUMENTS

| | | |
|---|---|---|
| EP | 1313206 A2 | 5/2003 |
| EP | 2611019 A2 | 7/2013 |
| GB | 2432267 A | 5/2007 |
| WO | 2009016340 A1 | 2/2009 |
| WO | 2013185847 A1 | 12/2013 |

OTHER PUBLICATIONS

Foreign Communication From a Counterpart Application, European Application No. 15788310.9, Extended European Search Report dated Oct. 12, 2016, 10 pages.

Partial English Translation and Abstract of Chinese Patent Application No. CN104079182, Nov. 6, 2015, 3 pages.

Foreign Communication From a Counterpart Application, PCT Application No. PCT/CN2015/072551, English Translation of International Search Report dated Apr. 29, 2015, 2 pages.

Foreign Communication From a Counterpart Application, PCT Application No. PCT/CN2015/072551, Written Opinion dated Apr. 29, 2015, 4 pages.

* cited by examiner

INVERTER POWER SUPPLY SYSTEM

CROSS-REFERENCE TO RELATED APPLICATIONS

This application is a continuation of International Application No. PCT/CN2015/072551, filed on Feb. 9, 2015, which claims priority to Chinese Patent Application No. 201410272694.4, filed on Jun. 18, 2014, both of which are hereby incorporated by reference in their entireties.

TECHNICAL FIELD

The present disclosure relates to the field of electric energy conversion, and in particular, to an inverter power supply system.

BACKGROUND

An inverter power supply system is widely used to provide electric energy for an alternating current load. The inverter power supply system generally includes an inverter, where a direct current voltage receive end of the inverter receives a direct current voltage, converts the direct current voltage into an alternating current voltage, and outputs the alternating current voltage to a load through an alternating current voltage output end of the inverter. Generally, the direct current voltage receive end is connected to a rectifier, and the rectifier converts an alternating current voltage, such as a mains voltage, into the direct current voltage, and outputs the direct current voltage to the inverter through the direct current voltage receive end. When power consumption of a load loaded at the alternating current voltage output end of the inverter increases, a voltage dip of a direct current bus connected to the direct current voltage receive end of the inverter is caused. When an increase of the load is large, the voltage dip of the direct current bus is quick, leading to instability of the inverter power supply system. In order to prevent the voltage dip of the direct current bus from being excessively quick in this case, a common method is to increase capacitance of the direct current bus or improve the rectifier, to increase a response speed of the rectifier, so as to reduce an amplitude of the voltage dip of the direct current bus and a time needed for restoring a voltage of the direct current bus to a stable value. However, the method of increasing the capacitance of the direct current bus increases a size and a manufacturing cost of the inverter power supply system. Because a change of the voltage of the bus is a lagged inertial stage, even if the response speed of the rectifier is increased, the voltage of the direct current bus still has a large dip amplitude, and the time needed for restoring the voltage of the direct current bus to the stable value is still long.

SUMMARY

An inverter power supply system is provided, which can effectively reduce a size and a cost of the inverter power supply system, and effectively improve stability of the inverter power supply system.

According to a first aspect, an inverter power supply system is provided, where the inverter power supply system includes an inverter circuit and a feedback circuit, where the inverter circuit is configured to convert a first alternating current voltage into a second alternating current voltage, and convert a first alternating current into a second alternating current; the feedback circuit determines whether a value of the second alternating current voltage exceeds a preset threshold; and when the value of the second alternating current voltage exceeds the preset threshold, the feedback circuit acquires a feedback current, compensates for a reference value of the first alternating current according to the feedback current, generates a control signal according to a reference value, after compensation, of the first alternating current, and outputs the control signal to the inverter circuit to adjust the value of the second alternating current voltage.

In a first possible implementation manner, the inverter circuit includes an alternating current power supply, a rectifier, and an inverter, where the alternating current power supply generates the first alternating current voltage and the first alternating current; the rectifier is configured to convert the first alternating current voltage and the first alternating current into a first direct current voltage and a first direct current respectively; the inverter is connected to the rectifier using a first direct current bus and a second direct current bus; and the inverter is configured to convert the first direct current voltage and the first direct current into the second alternating current voltage and the second alternating current respectively.

With reference to the first possible implementation manner, in a second possible implementation manner, the feedback circuit includes a detection unit and a rectifier control unit, where the detection unit is connected to the inverter circuit, detects a signal output by the inverter circuit, and outputs a detection result; the rectifier control unit receives the detection result, where the detection result includes the value of the second alternating current voltage; and the rectifier control unit is configured to determine, according to the detection result, whether the value of the second alternating current voltage exceeds the preset threshold.

With reference to the second possible implementation manner, in a third possible implementation manner, the rectifier control unit includes a determining unit, a sample data processing unit, and a loop control and wave-making unit; and the detection result further includes a value of the first alternating current voltage, a value of the second alternating current, a value of a voltage of the first direct current bus, and a value of a voltage of the second direct current bus, where the determining unit is configured to receive the second alternating current voltage output by the detection unit, and determine whether the value of the second alternating current voltage exceeds the preset threshold; when the value of the second alternating current voltage exceeds the preset threshold, the determining unit sends an enabling signal to the sample data processing unit; the sample data processing unit performs calculation on the first alternating current voltage, the second alternating current voltage, and the second alternating current, to obtain the feedback current; and sends the feedback current to the loop control and wave-making unit; and the loop control and wave-making unit compensates for the reference value, which is prestored in the loop control and wave-making unit, of the first alternating current using the feedback current, and generates the control signal according to the reference value, after compensation, of the first alternating current.

With reference to the third possible implementation manner, in a fourth possible implementation manner, the reference value of the first alternating current is obtained through calculation using a function based on differences obtained by subtracting the voltage of the first direct current bus and the voltage of the second direct current bus from a reference value of the voltage of the first direct current bus and a reference value of the voltage of the second direct current bus respectively, where the reference value of the voltage of the first direct current bus and the reference value of the voltage of the second direct current bus are preset constants, and the function is an integral function or a product function.

With reference to the third or the fourth possible implementation manner, in a fifth possible implementation manner, the obtaining, by the sample data processing unit, the feedback current according to the first alternating current voltage, the second alternating current voltage, and the second alternating current includes calculating an active component modulus value of the second alternating current voltage and the second alternating current, performing coordinate transformation on the first alternating current voltage, and obtaining the feedback current according to data obtained by calculating the active component modulus value of the second alternating current voltage and the second alternating current and data obtained by performing the coordinate transformation on the first alternating current voltage.

With reference to the first aspect and any one of the first to the fifth possible implementation manners of the first aspect, in a sixth possible implementation manner, the control signal is configured to adjust the value of the first direct current voltage output by the rectifier, to adjust the second alternating current voltage output by the rectifier.

With reference to any one of the first to the fifth possible implementation manners, in a seventh possible implementation manner, the inverter power supply system further includes a first capacitor and a second capacitor, where one end of the first capacitor is electrically connected to the first direct current bus, and the other end is grounded; and one end of the second capacitor is connected to the second direct current bus, and the other end is grounded.

With reference to any one of the first to the fifth possible implementation manners or with reference to the seventh possible implementation manner, in an eighth possible implementation manner, the alternating current power supply includes a first output end, a second output end, a third output end, and a first common end, where the first alternating current voltage is a three-phase alternating current voltage, which comprises a first-phase alternating current voltage, a second-phase alternating current voltage, and a third-phase alternating current voltage, and the first-phase alternating current voltage, the second-phase alternating current voltage, and the third-phase alternating current voltage have a same voltage amplitude, and sequentially differ by a phase difference of 120°; the first alternating current is a three-phase alternating current, which comprises a first-phase alternating current, a second-phase alternating current, and a third-phase alternating current, and the first-phase alternating current, the second-phase alternating current, and the third-phase alternating current have a same current amplitude, and sequentially differ by a phase difference of 120°; the first-phase alternating current voltage and the first-phase alternating current are output through the first output end and the first common end; the second-phase alternating current voltage and the second-phase alternating current are output through the second output end and the first common end; and the third-phase alternating current voltage and the third-phase alternating current are output through the third output end and the first common end; and the inverter power supply system further includes a first inductor, a second inductor, and a third inductor, where the first output end is connected to the first inductor to the rectifier; the second output end is connected to the second inductor to the rectifier; the third output end is connected to the third inductor to the rectifier; and the first common end is connected to the rectifier.

With reference to the eighth possible implementation manner, in a ninth possible implementation manner, the inverter power supply system further includes the first inductor, the second inductor, and the third inductor, where the first output end is connected to one end of the first inductor, and the other end of the first inductor is electrically connected to the rectifier; the second output end is connected to one end of the second inductor, and the other end of the second inductor is electrically connected to the rectifier; the third output end is connected to one end of the third inductor, and the other end of the third inductor is electrically connected to the rectifier; and the first common end is connected to the rectifier.

With reference to the eighth or the ninth possible implementation manner, in a tenth possible implementation manner, the inverter power supply system further includes a first filter capacitor, a second filter capacitor, and a third filter capacitor, where one end of the first filter capacitor is electrically connected to the first output end, and the other end is connected to the first common end; one end of the second filter capacitor is connected to the second output end, and the other end is connected to the first common end; and one end of the third filter capacitor is electrically connected to the third output end, and the other end is connected to the first common end.

With reference to the first aspect or any one of the first to the fifth possible implementation manners or with reference to any one of the seventh to the tenth possible implementation manners, in an eleventh possible implementation manner, the inverter includes a fourth output end, a fifth output end, a sixth output end, and a second common end; and the inverter power supply system further includes a fourth inductor, a fifth inductor, and a sixth inductor, where the fourth output end is connected to one end of the fourth inductor, and the other end of the fourth inductor is electrically connected to a load; the fifth output end is connected to one end of the fifth inductor, and the other end of the fifth inductor is electrically connected to the load; the sixth output end is connected to one end of the sixth inductor, and the other end of the sixth inductor is electrically connected to the load; and the second common end is connected to the load, to output the second alternating current voltage and the second alternating current to the load.

With reference to the eleventh possible implementation manner, in a twelfth possible implementation manner, the inverter power supply system further includes a fourth filter capacitor, a fifth filter capacitor, and a sixth filter capacitor, where one end of the fourth filter capacitor is connected to the fourth output end, and the other end is connected to the second common end; one end of the fifth filter capacitor is connected to the fifth output end, and the other end is connected to the second common end; and one end of the sixth filter capacitor is connected to the sixth output end, and the other end is connected to the second common end.

With reference to the first aspect or any one of the first to the twelfth possible implementation manners of the first aspect, in a thirteenth possible implementation manner, the control signal is a pulse width modulation signal, and a value of the first direct current voltage is adjusted by adjusting a duty cycle of the pulse width modulation signal.

With reference to the thirteenth possible implementation manner, in a fourteenth possible implementation manner, when the duty cycle of the pulse width modulation signal is reduced, the value of the first direct current voltage is reduced, so as to reduce the value of the second alternating current voltage.

With reference to any one of the first to the fifth possible implementation manners or any one of the seventh to the twelfth possible implementation manners, in a fifteenth possible implementation manner, the rectifier includes a first switch unit, a second switch unit, a third switch unit, a first sub capacitor, and a second sub capacitor, where the first sub capacitor includes a first end and a second end; and the second sub capacitor includes a third end and a fourth end, where the second end is connected to the third end and the first common end; the first switch unit is connected between the first end and the fourth end; the second switch unit is connected between the first end and the fourth end; the third switch unit is connected between the first end and the fourth end; the first switch unit is connected to the first output end; the second switch unit is connected to the second output end; the third switch unit is connected to the third output end; the first end is connected to the inverter using the first direct current bus; the second end is connected to the inverter using the second direct current bus; and the first switch unit, the second switch unit, and the third switch unit are electrically connected to the rectifier control unit, to receive the control signal.

With reference to the fifteenth possible implementation manner, in a sixteenth possible implementation manner, the first switch unit includes a first sub switch unit and a second sub switch unit, where the first sub switch unit and the second sub switch unit each include a first control end, a first conduction end, and a second conduction end, where the first conduction end of the first sub switch unit is electrically connected to the first end; the second conduction end of the first sub switch unit is electrically connected to the first conduction end of the second sub switch unit; the second conduction end of the second switch unit is electrically connected to the fourth end; and the first control ends of the first sub switch unit and the second sub switch unit are both connected to the rectifier control unit, to receive the control signal.

With reference to the fifteenth or the sixteenth possible implementation manner, in a seventeenth possible implementation manner, the second switch unit includes a third sub switch unit and a fourth sub switch unit, where the third sub switch unit and the fourth sub switch unit each include a second control end, a third conduction end, and a fourth conduction end, where the third conduction end of the third sub switch unit is electrically connected to the first end; the fourth conduction end of the third sub switch unit is electrically connected to the third conduction end of the fourth sub switch unit; the fourth conduction end of the fourth sub switch unit is electrically connected to the third end; and the second control ends of the third sub switch unit and the fourth sub switch unit are both electrically connected to the rectifier control unit, to receive the control signal.

With reference to any one of the fifteenth to the seventeenth possible implementation manners, in an eighteenth possible implementation manner, the third switch unit includes a fifth sub switch unit and a sixth sub switch unit, where the fifth sub switch unit and the sixth sub switch unit each include a third control end, a fifth conduction end, and a sixth conduction end, where the fifth conduction end of the fifth sub switch unit is electrically connected to the first end; the fifth conduction end of the fifth sub switch unit is electrically connected to the fifth conduction end of the sixth sub switch unit; the sixth conduction end of the sixth sub switch unit is electrically connected to the fourth end; and the third control ends of the fifth sub switch unit and the sixth sub switch unit are both electrically connected to the rectifier control unit, to receive the control signal.

Compared with the prior art, in the inverter power supply system provided by the foregoing implementation manners, a reference value of a first alternating current voltage is adjusted according to a feedback signal obtained using a first alternating current voltage, a second alternating current voltage, and a second alternating current, which does not cause dips of a voltage of a first direct current bus and a voltage of a second direct current bus, such that the inverter power supply system is more stable. Neither capacitance of the first direct current bus nor capacitance of the second direct current bus needs to be increased; therefore, a size and a cost of the inverter power supply system can be effectively reduced. In addition, the reference value of the first alternating current voltage is compensated for by using a feedback current, and a control signal is generated, to adjust a value of a first direct current voltage, so as to adjust a value of the second alternating current voltage; and adjustment on the control signal is closer to an end at which the control signal is generated when compared with adjustment on the control signal using dips of the voltage of the first direct current bus and the voltage of the second direct current bus; therefore, an adjustment speed is higher.

BRIEF DESCRIPTION OF DRAWINGS

To describe the technical solutions in the embodiments of the present disclosure or in the prior art more clearly, the following briefly introduces the accompanying drawings required for describing the embodiments or the prior art. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
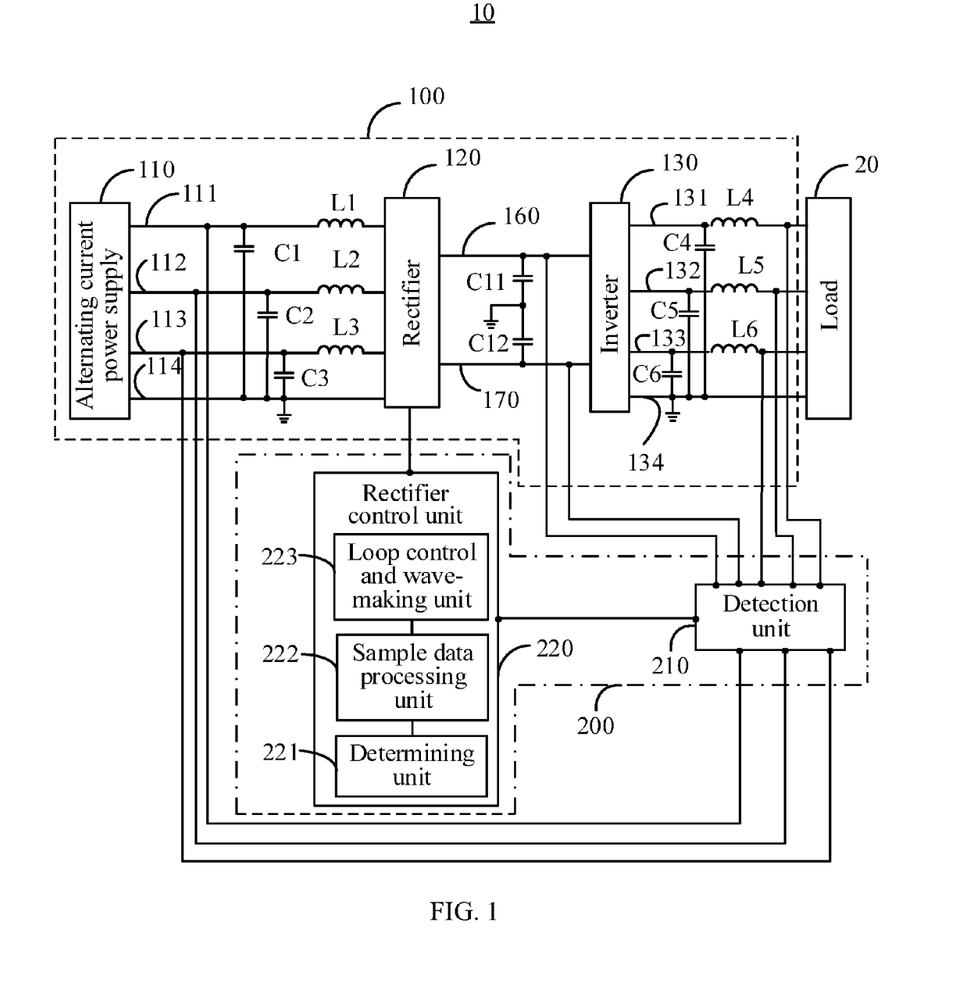
FIG. 1 is a schematic circuit configuration diagram of an inverter power supply system according to an exemplary implementation manner of the present disclosure.

Refer to FIG. 1, which is a schematic circuit configuration diagram of an inverter power supply system according to an exemplary implementation manner of the present disclosure. The inverter power supply system 10 includes an inverter circuit 100 and a feedback circuit 200. The inverter circuit 100 is configured to convert a first alternating current voltage into a second alternating current voltage, and convert a first alternating current into a second alternating current. The feedback circuit 200 determines whether a value of the second alternating current voltage exceeds a preset threshold. When the value of the second alternating current voltage exceeds the preset threshold, the feedback circuit 200 acquires a feedback current, compensates for a reference value of the first alternating current according to the feedback current, generates a control signal according to a reference value, after compensation, of the first alternating current, and outputs the control signal to the inverter circuit 100, to adjust the value of the second alternating current voltage.

The inverter circuit 100 includes an alternating current power supply 110, a rectifier 120, and an inverter 130. The alternating current power supply 110 generates the first alternating current voltage and the first alternating current. The rectifier 120 is electrically connected to the alternating current power supply 110, and converts the first alternating current voltage and the first alternating current into a first direct current voltage and a first direct current respectively. The inverter 130 is connected to the rectifier 120 by a first direct current bus 160 and a second direct current bus 170. The inverter 130 converts the first direct current voltage and the first direct current into the second alternating current voltage and the second alternating current respectively, and outputs the second alternating current voltage and the second alternating current to a load 20.

The feedback circuit 200 includes a detection unit 210 and a rectifier control unit 220. The detection unit 210 is connected to the inverter circuit 100, and is configured to detect a signal output by the inverter 130, and output a detection result. The rectifier control unit 220 receives the detection result, where the detection result includes the value of the second alternating current voltage; and the rectifier control unit 220 is configured to determine, according to the detection result, whether the value of the second alternating current voltage exceeds the preset threshold.

More specifically, the detection unit 210 detects a value of the first alternating current voltage, a value of the first alternating current, the value of the second alternating current voltage, a value of the second alternating current, a value of a voltage of the first direct current bus 160, and a value of a voltage of the second direct current bus 170. The rectifier control unit 220 has one end electrically connected to the detection unit 210 and the other end electrically connected to the rectifier 120, and is configured to receive the first alternating current voltage, the first alternating current, the second alternating current voltage, and the second alternating current. The rectifier control unit 220 determines whether the value of the second alternating current voltage exceeds the preset threshold; when the value of the second alternating current voltage exceeds the preset threshold, the rectifier control unit 220 obtains a feedback current according to the first alternating current voltage, the second alternating current voltage, and the second alternating current, compensates for the reference value of the first alternating current using the feedback current, generates a control signal according to the reference value, after compensation, of the first alternating current, and outputs the control signal to the rectifier 120, to adjust a value of the first direct current voltage output by the rectifier 120, so as to adjust the value of the second alternating current voltage. The reference value of the first alternating current is obtained through calculation using a function based on differences obtained by subtracting the voltage of the first direct current bus and the voltage of the second direct current bus from a reference value of the voltage of the first direct current bus and a reference value of the voltage of the second direct current bus respectively. The reference value of the voltage of the first direct current bus and the reference value of the voltage of the second direct current bus are fixed values. In an implementation manner, a value of the preset threshold is an upper limit of an alternating current voltage that the load 20 can withstand. The rectifier control unit 220 determines, by determining whether the value of the second alternating current voltage exceeds the preset threshold, that an increase of the load 20 is large, which may cause system instability.

The rectifier control unit 220 includes a determining unit 221, a sample data processing unit 222, and a loop control and wave-making unit 223. The detection result further includes the value of the first alternating current voltage, the value of the second alternating current, the value of the voltage of the first direct current bus 160, and the value of the voltage of the second direct current bus 170. The determining unit 221 is electrically connected to the detection unit 210, and is configured to receive the second alternating current voltage output by the detection unit 210, and determine whether the value of the second alternating current voltage exceeds the preset threshold. When the value of the second alternating current voltage exceeds the preset threshold, the determining unit 221 sends an enabling signal to the sample data processing unit 222. The sample data processing unit 222 is electrically connected to the detection unit 210, the determining unit 221, and the loop control and wave-making unit 223. The sample data processing unit 222 receives the enabling signal sent by the determining unit 221, and under control of the enabling signal, receives the first alternating current voltage, the first alternating current, the second alternating current voltage, and the second alternating current that are output by the detection unit 210, calculates the first alternating current voltage, the second alternating current voltage, and the second alternating current to obtain the feedback current, and outputs the feedback current. More specifically, the obtaining, by the sample data processing unit 222, the feedback current according to the first alternating current voltage, the second alternating current voltage, and the second alternating current includes calculating an active component modulus value of the second alternating current voltage and the second alternating current, performing coordinate transformation on the first alternating current voltage, and obtaining the feedback current according to data obtained by calculating the active component modulus value of the second alternating current voltage and the second alternating current and data obtained by performing the coordinate transformation on the first alternating current voltage. The loop control and wave-making unit 223 receives the feedback current, compensates for the reference value, which is prestored in the loop control and wave-making unit 223, of the first alternating current voltage using the feedback current, and generates the control signal according to the reference value, after compensation, of the first alternating current voltage.

In this implementation manner, the alternating current power supply 110 is a three-phase alternating current power supply, that is, the first alternating current voltage is a three-phase alternating current voltage, and the first alternating current is a three-phase alternating current. The first alternating current voltage includes a first-phase alternating current voltage, a second-phase alternating current voltage, and a third-phase alternating current voltage, and the first-phase alternating current voltage, the second-phase alternating current voltage, and the third-phase alternating current voltage have a same voltage amplitude, and sequentially differ by a phase difference of 120°. The first alternating current includes a first-phase alternating current, a second-phase alternating current, and a third-phase alternating current, and the first-phase alternating current, the second-phase alternating current, and the third-phase alternating current have a same current amplitude, and sequentially differ by a phase difference of 120°. The alternating current power supply 110 includes a first output end 111, a second output end 112, a third output end 113, and a first common end 114. The first-phase alternating current voltage and the first-phase alternating current are output through the first output end 111 and the first common end 114; the second-phase alternating current voltage and the second-phase alternating current are output through the second output end 112 and the first common end 114; and the third-phase alternating current voltage and the third-phase alternating current are output through the third output end 113 and the first common end 114.

In this implementation manner, the inverter power supply system 10 further includes a first inductor L1, a second inductor L2, and a third inductor L3. The first output end 111 is connected to one end of the first inductor L1, and the other end of the first inductor L1 is electrically connected to the rectifier 120; the second output end 112 is connected to one end of the second inductor L2, and the other end of the second inductor L2 is electrically connected to the rectifier 120; the third output end 113 is connected to one end of the third inductor L3, and the other end of the third inductor L3 is electrically connected to the rectifier 120; and the first common end 114 is connected to the rectifier 120. The first inductor L1, the second inductor L2, and the third inductor L3 are freewheeling inductors. The first inductor L1 is configured to store energy of the first-phase alternating current voltage and the first-phase alternating current and transfer the energy to the rectifier 120; the second inductor L2 is configured to store energy of the second-phase alternating current voltage and the second-phase alternating current and transfer the energy to the rectifier 120; and the third inductor L3 is configured to store energy of the third-phase alternating current voltage and the third-phase alternating current and transfer the energy to the rectifier 120.

The inverter power supply system 10 further includes a first filter capacitor C1, a second filter capacitor C2, and a third filter capacitor C3. The first filter capacitor C1 has one end electrically connected to the first output end 111 and the other end electrically connected to the first common end 114, and is configured to filter out ripples in the first-phase alternating current voltage and the first-phase alternating current. The second filter capacitor C2 has one end electrically connected to the second output end 112 and the other end electrically connected to the first common end 114, and is configured to filter out ripples in the second-phase alternating current voltage and the second-phase alternating current. The third filter capacitor C3 has one end electrically connected to the third output end 113 and the other end electrically connected to the first common end 114, and is configured to filter out ripples in the third-phase alternating current voltage and the third-phase alternating current.

The rectifier 120 is electrically connected to the alternating current power supply 110, receives the first alternating current voltage output by the alternating current power supply 110, and converts the first alternating current voltage into the first direct current voltage, and converts the first alternating current into the first alternating current. More specifically, the rectifier 120 is electrically connected to the first inductor L1 to the first output end 111, is electrically connected to the second inductor L2 to the second output end 112, is electrically connected to the third inductor L3 to the third output end 113, and is electrically connected to the first common end 114. The rectifier 120 receives the first-phase alternating current voltage and the first-phase alternating current that are output through the first output end 111 and the first common end 114, receives the second-phase alternating current voltage and the second-phase alternating current that are output through the second output end 112 and the first common end 114, and receives the third-phase alternating current voltage and the third-phase alternating current that are output through the third output end 113 and the first common end 114.

The inverter power supply system 10 further includes a first capacitor C11 and a second capacitor C12. One end of the first capacitor C11 is electrically connected to the first direct current bus 160, and the other end is grounded; and one end of the second capacitor C12 is electrically connected to the second direct current bus 170, and the other end is grounded. The first capacitor C11 and the second capacitor C12 are configured to balance the value of the voltage of the first direct current bus 160 and the value of the voltage of the second direct current bus 170, to enable the voltage of the first direct current bus and the voltage of the second direct current bus to be stable, so as to avoid damage to the first direct current bus 160 or the second direct current bus 170 that is caused when the value of the voltage of the first direct current bus 160, and the value of the voltage of the second direct current bus 170 are unbalanced. More specifically, when unbalance is caused when there is a difference between the value of the voltage of the first direct current bus 160, and the value of the voltage of the second direct current bus 170, or when a case of unbalance between the value of the voltage of the first direct current bus 160, and the value of the voltage of the second direct current bus 170 that is caused because the inverter 130 connected to the first direct current bus 160 and the second direct current bus 170 loads instantly an unbalanced load occurs, if the first capacitor C11 and the second capacitor C12 do not exist, unbalance between the first direct current bus 160 and the second direct current bus 170 is caused, and a worse case is that the first direct current bus 160 and the second direct current bus 170 fail due to overvoltage, causing damage to the first direct current bus 160 and the second direct current bus 170.

The inverter 130 further includes a fourth output end 131, a fifth output end 132, a sixth output end 133, and a second common end 134. The inverter power supply system further includes a fourth inductor L4, a fifth inductor L5, and a sixth inductor L6. The fourth output end 131 is connected to the fourth inductor L4 to the load 20; the fifth output end 132 is connected to the fifth inductor L5 to the load 20; the sixth output end 133 is connected to the sixth inductor L6 to the load 20; the second common end 134 is electrically connected to the load 20, to output the second alternating current voltage and the second alternating current to the load 20. More specifically, in this implementation manner, the second alternating current voltage is a three-phase alternating current voltage; the second alternating current voltage includes a fourth-phase alternating current voltage, a fifth-phase alternating current voltage, and a sixth-phase alternating current voltage; and the fourth-phase alternating current voltage, the fifth-phase alternating current voltage, and the sixth-phase alternating current voltage have a same voltage amplitude, and sequentially differ by a phase difference of 120°. The second alternating current is a three-phase alternating current; the second alternating current includes a fourth-phase alternating current, a fifth-phase alternating current, and a sixth-phase alternating current; and the fourth-phase alternating current, the fifth-phase alternating current, and the sixth-phase alternating current have a same current amplitude, and sequentially differ by a phase difference of 120°. The fourth-phase alternating current voltage and the fourth-phase alternating current are output to the load 20 through the fourth output end 131 and the second common end 134; the fifth-phase alternating current voltage and the fifth-phase alternating current are output to the load 20 through the fifth output end 132 and the second common end 134; the sixth-phase alternating current voltage and the sixth-phase alternating current are output to the load 20 through the sixth output end 133 and the second common end 134. The fourth inductor L4, the fifth inductor L5, and the sixth inductor L6 are freewheeling inductors. The fourth inductor L4 is configured to store energy of the fourth-phase alternating current voltage and the fourth-phase alternating current and transfer the energy to the load 20; the fifth inductor L5 is configured to store energy of the fifth-phase alternating current voltage and the fifth-phase alternating current and transfer the energy to the load 20; and the sixth inductor L6 is configured to store energy of the sixth-phase alternating current voltage and the sixth-phase alternating current and transfer the energy to the load 20.

The inverter power supply system 10 further includes a fourth filter capacitor C4, a fifth filter capacitor C5, and a sixth filter capacitor C6. The fourth filter capacitor C4 has one end electrically connected to the fourth output end 131 and the other end connected to the second common end 134, and is configured to filter out ripples in the fourth-phase alternating current voltage and the fourth-phase alternating current. The fifth filter capacitor C5 has one end electrically connected to the fifth output end 132 and the other end electrically connected to the second common end 134, and is configured to filter out ripples in the fifth-phase alternating current voltage and the fifth-phase alternating current. The sixth filter capacitor C6 has one end electrically connected to the sixth output end 133 and the other end electrically connected to the second common end 134, and is configured to filter out ripples in the sixth-phase alternating current voltage and the sixth-phase alternating current.

Figure 2:
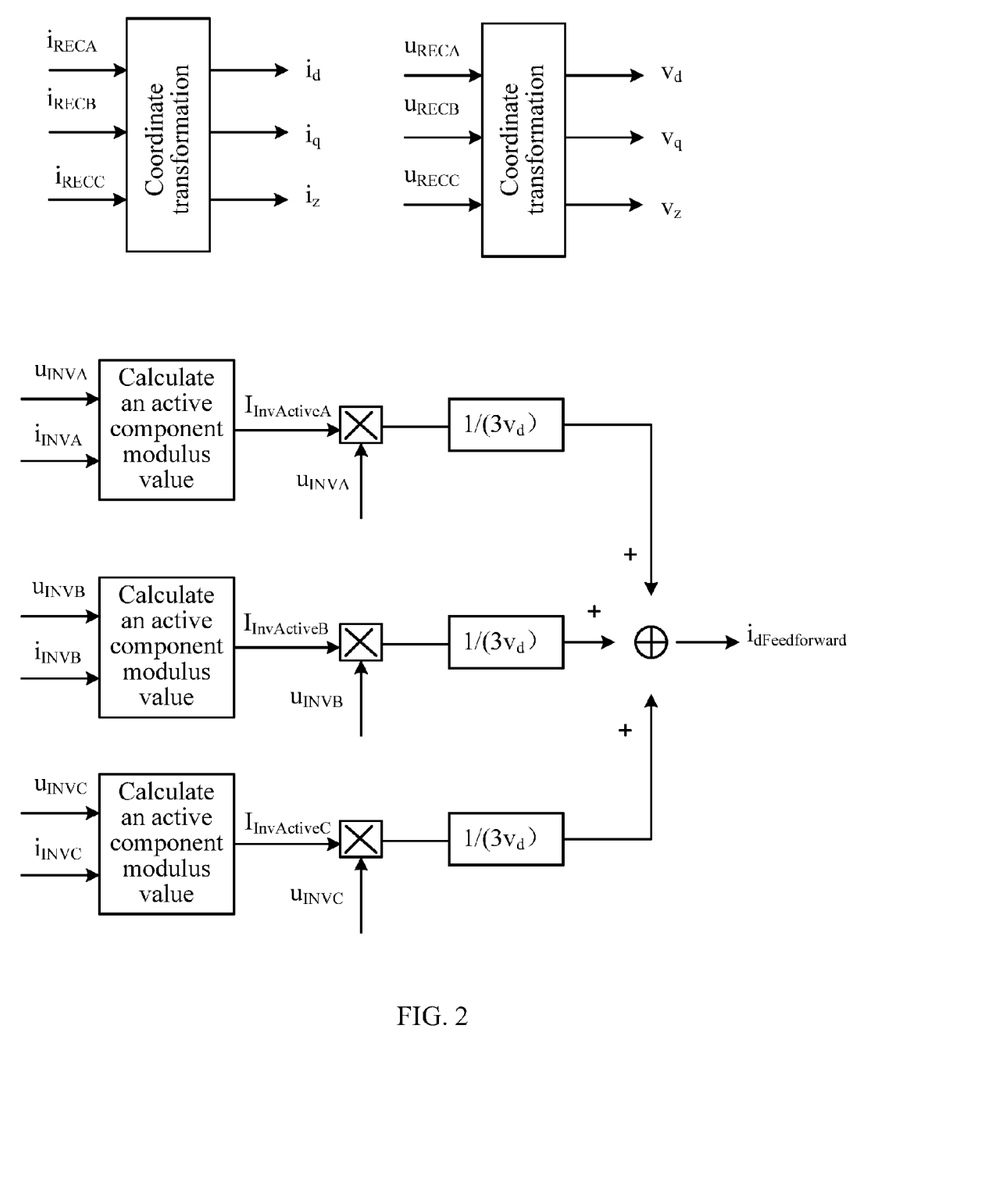
FIG. 2 is a schematic diagram of processing, by a sample data processing unit in a rectifier control unit in an inverter power supply system, data according to an exemplary implementation manner of the present disclosure.

Also refer to FIG. 2, which is a schematic diagram of processing, by a sample data processing unit in a rectifier control unit in an inverter power supply system, data according to an exemplary implementation manner of the present disclosure. In this implementation manner, for convenience of description, the first-phase alternating current voltage, the first-phase alternating current, the second-phase alternating current voltage, the second-phase alternating current, the third-phase alternating current voltage, and the third-phase alternating current are indicated by $U_{RECA}$, $i_{RECA}$, $u_{RECB}$, $i_{RECB}$, $u_{RECC}$, and $i_{RECC}$ respectively; the fourth-phase alternating current voltage, the fourth-phase alternating current, the fifth-phase alternating current voltage, the fifth-phase alternating current, the sixth-phase alternating current voltage, and the sixth-phase alternating current are indicated by $u_{INVA}$, $i_{INVA}$, $u_{INVB}$, $i_{INVB}$, $u_{INVC}$, and $i_{INVC}$ respectively; and the feedback current is indicated by $i_{dFeedforward}$. The sample data processing unit 222 (shown in FIG. 1) performs coordinate transformation on the first-phase alternating current $i_{RECA}$, the second-phase alternating current $i_{RECB}$, and the third-phase alternating current $i_{RECC}$, to facilitate subsequent calculation. In this implementation manner, the sample data processing unit 222 performs coordinate transformation, from an ABC coordinate system to a DQZ coordinate system, on the first-phase alternating current $i_{RECA}$, the second-phase alternating current $i_{RECB}$, and the third-phase alternating current $i_{RECC}$, to obtain currents $i_d$, $i_q$, and $i_z$ that are corresponding to the first-phase alternating current $i_{RECA}$, the second-phase alternating current $i_{RECB}$, and the third-phase alternating current $i_{RECC}$ and that are in the DQZ coordinate system respectively. The sample data processing unit 222 further performs coordinate transformation on the first-phase alternating current voltage $u_{RECA}$, the second-phase alternating current voltage $u_{RECB}$, and the third-phase alternating current voltage $u_{RECC}$, to facilitate subsequent calculation. In this implementation manner, the sample data processing unit 222 performs coordinate transformation, from the ABC coordinate system to the DQZ coordinate system, on the first-phase alternating current voltage $u_{RECA}$, the second-phase alternating current voltage $u_{RECB}$, and the third-phase alternating current voltage $u_{RECC}$, to obtain voltages $v_d$, $v_q$, and $v_z$ that are corresponding to the first-phase alternating current voltage $u_{RECA}$, the second-phase alternating current voltage $u_{RECB}$, and the third-phase alternating current voltage $u_{RECC}$ and that are in the DQZ coordinate system respectively.

The sample data processing unit 222 further calculates an active component modulus value of the fourth-phase alternating current voltage $u_{INVA}$ and the fourth-phase alternating current $i_{INVA}$, to obtain the active component modulus value of the fourth-phase alternating current voltage $u_{INVA}$ and the fourth-phase alternating current $i_{INVA}$; and for convenience of description, the obtained active component modulus value of the fourth-phase alternating current voltage $u_{INVA}$ and the fourth-phase alternating current $i_{INVA}$ is named as a first active component modulus value and is indicated by a symbol $I_{InvActiveA}$. Similarly, the sample data processing unit 222 further calculates an active component modulus value of the fifth-phase alternating current voltage $u_{INVB}$ and the fifth-phase alternating current $i_{INVB}$, to obtain the active component modulus value of the fifth-phase alternating current voltage $u_{INVB}$ and the fifth-phase alternating current $i_{INVB}$; and for convenience of description, the obtained active component modulus value of the fifth-phase alternating current voltage $u_{INVB}$ and the fifth-phase alternating current $i_{INVB}$ is named as a second active component modulus value and is indicated by a symbol $I_{InvActiveB}$. The sample data processing unit 222 further calculates an active component modulus value of the sixth-phase alternating current voltage $i_{INVC}$ and the sixth-phase alternating current $i_{INVC}$, to obtain the active component modulus value of the sixth-phase alternating current voltage $u_{INVC}$ and the sixth-phase alternating current $i_{INVC}$; and for convenience of description, the obtained active component modulus value of the sixth-phase alternating current voltage $u_{INVC}$ and the sixth-phase alternating current $I_{INVC}$ is named as a third active component modulus value and is indicated by a symbol $I_{InvActiveC}$.

The sample data processing unit 222 obtains the feedback current according to the first alternating current voltage, the second alternating current voltage, and the second alternating current. In this implementation manner, the feedback current $i_{dFeedforward}$ is expressed by the following formula:

$$i_{dFeedforward} = (I_{InvActiveA} * u_{INVA} + I_{InvActiveB} * u_{INVB} + I_{InvActiveC} * u_{INVC})/(3v_d) \quad (1)$$

The sample data processing unit 222 outputs the obtained feedback current $i_{dFeedforward}$, $i_d$, $i_q$, $i_z$, $v_d$, $v_q$, and $v_z$ to the loop control and wave-making unit 223.

Figure 3:
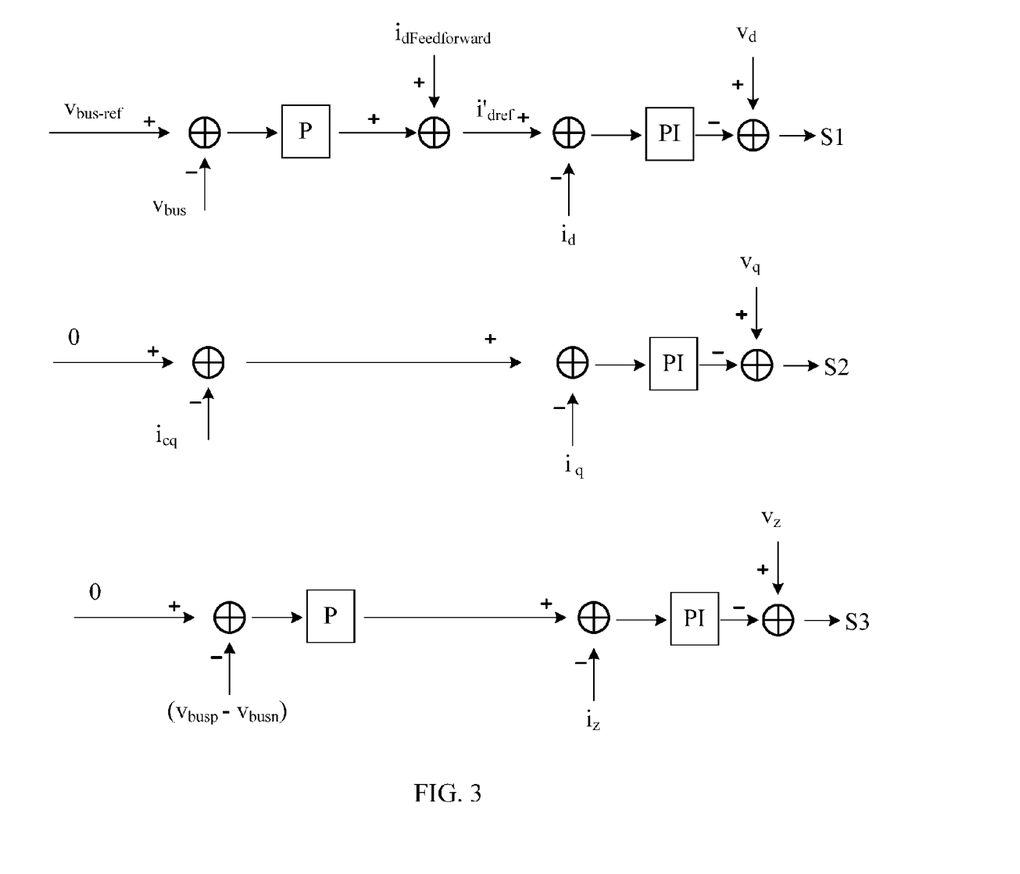
FIG. 3 is a schematic diagram of adjusting, by a loop control and wave-making unit in an inverter power supply system according to a feedback current, a first direct current voltage output by a rectifier according to an exemplary implementation manner of the present disclosure.

Also refer to FIG. 3, which is a schematic diagram of adjusting, by the loop control and wave-making unit in the inverter power supply system according to the feedback current, the first direct current voltage output by the rectifier according to an exemplary implementation manner of the present disclosure. As shown in FIG. 3, the reference value $i_{dref}$ of the first alternating current is compensated for using the feedback current $I_{dFeedforward}$. For convenience of description, a reference value that is of the first alternating current and that is obtained by compensating for the reference value $i_{dref}$ of the first alternating current using the feedback current $i_{dFeedforward}$ is indicated by $i'_{dref}$. The loop control and wave-making unit 223 (shown in FIG. 1) generates the control signal according to the reference value $i'_{dref}$, after compensation, of the first alternating current, and outputs the control signal to the rectifier 120, to adjust the value of the first direct current voltage output by the rectifier 120, so as to adjust the value of the second alternating current voltage. The reference value of the first alternating current voltage is a function of the voltage of the first direct current bus and the voltage of the second direct current bus. More specifically, a working principle of the loop control and wave-making unit 223 is described as follows. For convenience of description, the voltage of the first direct current bus and the voltage of the second direct current bus are indicated by symbols $v_{busp}$ and $v_{busn}$ respectively. The reference value $i_{dref}$ of the first alternating current is expressed by a formula (2):

$$i_{dref} = P(v_{bus\text{-}ref} - v_{bus}) \qquad (2)$$

where $v_{bus\text{-}ref}$ indicates a reference value of a bus voltage, and is a fixed value; $v_{bus}$ indicates a sum of the first direct current bus voltage $v_{busp}$ and the second direct current bus voltage $v_{busn}$; and P indicates that $i_{dref}$ is a function of $v_{bus\text{-}ref}$ and $v_{bus}$. Because $v_{bus\text{-}ref}$ indicates the reference value of the bus voltage, and is a fixed value, and $V_{bus}$ indicates the sum of the first direct current bus voltage $v_{busp}$ and the second direct current bus voltage $v_{busn}$, the reference value $i_{dref}$ of the first alternating current is the function of the first direct current bus voltage $v_{busp}$ and the second direct current bus voltage $v_{busn}$, where the function P may be an integral function or may be a product function.

The reference value $i'_{dref}$, after compensation using the feedback current $i_{dFeedforward}$, of the first alternating current is expressed by a formula (3):

$$i_{dref} = P(v_{bus\text{-}ref} - v_{bus}) + i_{dFeedforward} \qquad (3)$$

A process in which the control signal is generated using the reference value, after compensation, of the first alternating current is described in detail as follows. In this implementation manner, there are three control signals, and for convenience of description, the generated three control signals are named as a first control signal, a second control signal, and a third control signal. The first control signal, the second control signal, and the third control signal are indicated by symbols S1, S2 and S3 respectively. Formulas of the first control signal, the second control signal, and the third control signal are expressed by formulas (4), (5), and (6) respectively:

$$S1 = v_d - PI(i'_{dref} - i_d) \qquad (4)$$

$$S2 = v_q - PI(i_{cq} + i_q) \qquad (5)$$

$$S3 = vz + PI[P^*(v_{busp} - v_{busn}) + i_z] \qquad (6)$$

where P is a function, PI also indicates a function, and the functions indicated by P and PI may be integral functions or may be product functions.

Preferably, the loop control and wave-making unit 223 is further configured to perform coordinate transformation on the first control signal S1, the second control signal S2, and the third control signal S3, to facilitate subsequent control on the rectifier 120. In this implementation manner, the loop control and wave-making unit 223 is further configured to perform coordinate transformation, from a DQZ coordinate axis to an ABC coordinate axis, on the first control signal S1, the second control signal S2, and the third control signal S3. Control signals obtained by performing the coordinate transformation, from the DQZ coordinate axis to the ABC coordinate axis, on the first control signal S1, the second control signal S2, and the third control signal S3 are output to the rectifier 120.

Figure 4:
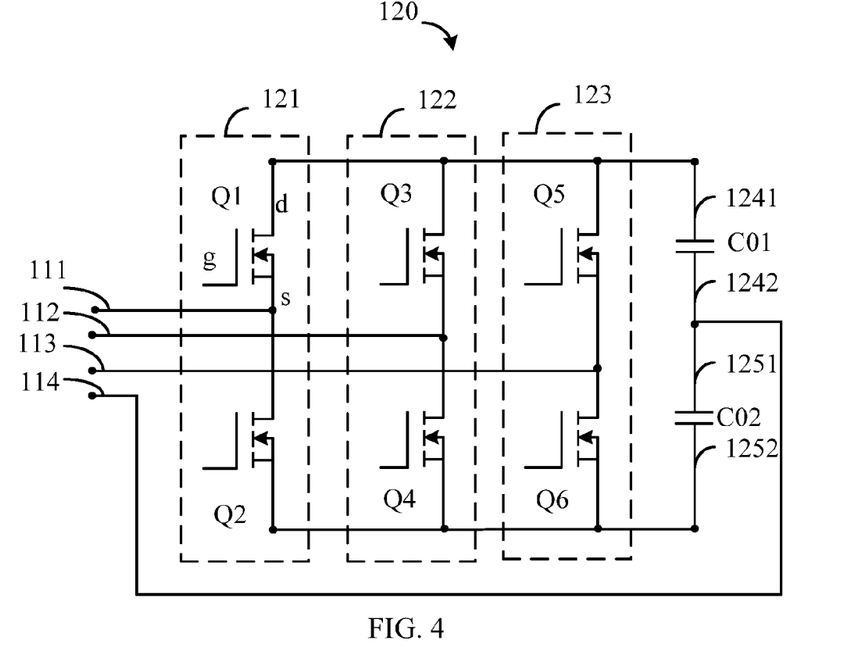
FIG. 4 is a schematic circuit configuration diagram of a rectifier in an inverter power supply system according to an exemplary implementation manner of the present disclosure.

Also refer to FIG. 4, which is a schematic circuit configuration diagram of a rectifier in an inverter power supply system according to an exemplary implementation manner of the present disclosure. The rectifier 120 includes a first sub capacitor C01, a second sub capacitor C02, a first switch unit 121, a second switch unit 122, and a third switch unit 123. The first sub capacitor C01 includes a first end 1241 and a second end 1242, where the first end 1241 and the second end 1242 may be an anode and a cathode of the first sub capacitor C01 respectively. The second sub capacitor C02 includes a third end 1251 and a fourth end 1252, where the third end 1251 and the fourth end 1252 may be an anode and a cathode of the second sub capacitor C02 respectively. The second end 1242 is electrically connected to the third end 1251 and is connected to the first common end 114. The first switch unit 121 is connected between the first end 1241 and the second end 1242; the second switch unit 122 is connected between the first end 1241 and the fourth end 1252; and the third switch unit 123 is connected between the first end 1241 and the fourth end 1252. In addition, the first switch unit 121 is electrically connected to the first output end 111, and is configured to receive the first-phase alternating current voltage and the first-phase alternating current. The second switch unit 122 is electrically connected to the second output end 112, and is configured to receive the second-phase alternating current voltage and the second-phase alternating current. The third switch unit 123 is electrically connected to the third output end 113, and is configured to receive the third-phase alternating current voltage and the third-phase alternating current. In addition, the first switch unit 121, the second switch unit 122, and the third switch unit 123 separately receive the control signal sent by the rectifier control unit 220, and are conducted or disconnected under control of a corresponding control signal. When the first switch unit 121, the second switch unit 122, and the third switch unit 123 are conducted under control of a corresponding control signal, a corresponding-phase alternating current voltage and a corresponding-phase alternating current charge the first sub capacitor C01 and the second sub capacitor C02 through a corresponding switch unit, such that the first sub capacitor C01 and the second sub capacitor C02 store energy; and the energy stored by the first sub capacitor C01 and the second sub capacitor C02 is output through the first end 121 and the fourth end 1252; therefore, the first alternating current voltage is converted into the first direct current voltage. More specifically, the first switch unit 121 receives the first control signal S1, and is conducted or disconnected under control of the first control signal S1. When the first switch unit 121 is conducted under control of the first control signal S1 sent by the rectifier control unit 220, the first-phase alternating current voltage and the first-phase alternating current charge the first sub capacitor C01 and the second sub capacitor C02 through the first switch unit 121, such that the first sub capacitor C01 and the second sub capacitor C02 store energy. The second switch unit 122 receives the second control signal S2, and is conducted or disconnected under control of the second control signal S2. When the second switch unit 122 is conducted under control of the second control signal S2 sent by the rectifier control unit 220, the second-phase alternating current voltage and the second-phase alternating current charge the first sub capacitor C01 and the second sub capacitor C02 through the second switch unit 122, such that the first sub capacitor C01 and the second sub capacitor C02 store energy. The third switch unit 123 receives the third control signal S3, and is conducted or disconnected under control of the third control signal S3. When the third switch unit 123 is conducted under control of the third control signal sent by the rectifier control unit 220, the third-phase alternating current voltage and the third-phase alternating current charge the first sub capacitor C01 and the second sub capacitor C02 through the third switch unit 123, such that the first sub capacitor C01 and the second sub capacitor C02 store energy. The first end 1241 is connected to the inverter 130 by the first direct current bus 160; and the second end 1252 is connected to the inverter 130 by the second direct current bus 170.

More specifically, the first switch unit 121 includes a first sub switch unit Q1 and a second sub switch unit Q2; the second switch unit 122 includes a third sub switch unit Q3 and a fourth sub switch unit Q4; and the third switch unit 123 includes a fifth sub switch unit Q5 and a sixth sub switch unit Q6. The first sub switch unit Q1, the second sub switch unit Q2, the third sub switch unit Q3, the fourth sub switch unit Q4, the fifth sub switch unit Q5, and the sixth sub switch unit Q6 each include a control end g, a first conduction end d, and a second conduction end s. The control end g of each sub switch unit is configured to receive the control signal sent by the rectifier control unit 220, and under control of a corresponding control signal, control a first conduction end d and a second conduction end s of a corresponding sub switch unit to be conducted or cut off, so as to conduct or disconnect the corresponding sub switch unit.

For example, the control end g of the first sub switch unit Q1 receives the first control signal sent by the rectifier control unit 220, and under control of the first control signal, controls the first conduction end d of the first sub switch unit Q1 and the second conduction end s of the first sub switch unit Q1 to be conducted or cut off, so as to conduct or disconnect the first sub switch unit Q1. When the control end g of the first sub switch unit Q1 controls, under control of the first control signal, the first conduction end d of the first sub switch unit Q1 and the second conduction end s of the first sub switch unit Q1 to be conducted, the first sub switch unit Q1 is conducted; and when the control end g of the first sub switch unit Q1 controls, under control of the first control signal, the first conduction end d of the first sub switch unit Q1 and the second conduction end s of the first sub switch unit Q1 to be cut off, the first sub switch unit Q1 is disconnected. The control end g of the second sub switch unit Q2 receives the first control signal sent by the rectifier control unit 220, and under control of the first control signal, controls the first conduction end d of the second sub switch unit Q2 and the second conduction end s of the second sub switch unit Q1 to be conducted or cut off, so as to conduct or disconnect the second sub switch unit Q2. When the control end g of the second sub switch unit Q2 controls, under control of the first control signal, the first conduction end d of the second sub switch unit Q2 and the second conduction end s of the second sub switch unit Q2 to be conducted, the second sub switch unit Q1 is conducted; and when the control end g of the second sub switch unit Q2 controls, under control of the first control signal, the first conduction end d of the second sub switch unit Q2 and the second conduction end s of the second sub switch unit Q2 to be cut off, the second sub switch unit Q2 is disconnected. It may be understood that, the control ends of the third sub switch unit Q3 and the fourth sub switch unit Q4 both receive the second control signal, and are conducted or disconnected under control of the second control signal. The control ends of the fifth sub switch unit Q5 and the sixth sub switch unit Q6 both receive the third control signal, and are conducted or disconnected under control of the third control signal. For a more specific control process, reference may be made to a process in which the first control signal controls the first sub switch unit Q1 and the second sub switch unit Q2, and details are not provided herein again.

In an implementation manner, the first sub switch unit Q1, the second sub switch unit Q2, the third sub switch unit Q3, the fourth sub switch unit Q4, the fifth sub switch unit Q5, and the sixth sub switch unit Q6 may be N-channel metal oxide semiconductor field effect transistors (NMOSFET). The control end g is a gate of the NMOSFET, the first conduction end d is a drain of the NMOSFET, and the second conduction end s is a source of the NMOSFET.

The control signal controls a conduction time of each switch unit, to adjust the value of the first direct current voltage output by the rectifier 120. In a case in which a conversion policy of the inverter 130 is fixed, the value of the second alternating current voltage is therefore adjusted. More specifically, when the control signal controls the conduction time of each switch unit to be reduced, the value of the first direct current voltage output by the rectifier 120 is reduced, and therefore, the value of the second alternating current voltage output through the inverter 130 is reduced. Therefore, the load 20 connected to the inverter 130 is protected from being burned due to overvoltage, the reference value of the first alternating current is compensated for using the feedback current, and as can be seen from FIG. 3, a change of $v_{bus}$ is not caused, that is, dips of the voltage of the first direct current bus and the voltage of the second direct current bus are not caused, such that the inverter power supply system 10 is more stable. In addition, compared with adjustment on the control signal using dips of the voltage of the first direct current bus and the voltage of the second bus (that is, a change in $v_{bus}$), adjustment on the control signal using the feedback current to compensate for the reference value of the first alternating current voltage is closer to an end at which the first control signal S1 is generated; therefore, that the reference value of the first alternating current voltage is compensated for using the feedback current, to generate the control signal, so as to adjust the value of the first direct current voltage, and therefore to adjust the value of the second alternating current voltage has a higher adjustment speed.

In this implementation manner, the control signal is a pulse width modulation (PWM) signal, and a conduction time of each switch unit is adjusted by adjusting a duty cycle of the PWM signal, so as to adjust the value of the first direct current voltage. More specifically, when the rectifier control unit 220 determines that the value of the second alternating current voltage exceeds the preset threshold, the first control signal controls conduction times of the first sub switch unit Q1 and the second sub switch unit Q2 to be reduced; the second control signal controls conduction times of the third sub switch unit Q3 and the fourth sub switch unit Q4 to be reduced; and the third control signal controls conduction times of the fifth sub switch unit Q5 and the sixth sub switch unit Q6 to be reduced. Therefore, the value of the first direct current voltage output by the rectifier 120 is reduced, and the value of the second alternating current voltage output through the inverter 130 is reduced.

To sum up, compared with the prior art, in the present disclosure, a reference value of a first alternating current voltage is adjusted according to a feedback signal obtained using the first alternating current voltage, a second alternating current voltage, and a second alternating current, which does not cause dips of a voltage of a first direct current bus and a voltage of a second direct current bus, such that an inverter power supply system is more stable. Neither capacitance of a first direct current bus nor capacitance of a second direct current bus needs to be increased; therefore, a size and a cost of the inverter power supply system can be effectively reduced. In addition, the reference value of the first alternating current voltage is compensated for using a feedback current, and a control signal is generated, to adjust a value of a first direct current voltage, so as to adjust a value of the second alternating current voltage; and adjustment on the control signal is closer to an end at which the control signal is generated when compared with adjustment on the control signal using dips of the voltage of the first direct current bus and the voltage of the second direct current bus; therefore, an adjustment speed is higher.

It may be understood that, although in all the foregoing embodiments, an example in which the first alternating current voltage is a three-phase alternating current voltage, the first alternating current is a three-phase alternating current, the second alternating current voltage is a three-phase alternating current voltage, and the second alternating current is a three-phase alternating current is used for description, a person of ordinary skill in the art may understand that, the foregoing three-phase alternating current voltages and three-phase alternating currents may also be single-phase alternating current voltages and single-phase alternating currents.

What is disclosed above is merely exemplary embodiments of the present disclosure, and is not intended to limit the protection scope of the present disclosure. A person of ordinary skill in the art may understand that all or some of processes that implement the foregoing embodiments and equivalent modifications made in accordance with the claims of the present disclosure shall fall within the scope of the present disclosure.

What is claimed is:

1. An inverter power supply system, comprising:
   an inverter circuit comprising a rectifier and configured to:
      convert a first alternating current (AC) voltage into a second AC voltage; and
      convert a first AC current into a second AC current; and
   a feedback circuit coupled to the inverter circuit, wherein the feedback circuit comprises a rectifier controller, comprising:
      a determiner, wherein the determiner is configured to:
         determine whether a second value of the second AC voltage exceeds a preset threshold voltage; and
         generate an enabling signal when the second value exceeds the preset threshold voltage;
      a sample data processor coupled to the determiner and configured to perform, in response to the enabling signal, a calculation on each of a first value of the first AC voltage, the second value of the second AC voltage, and a third value of the second AC current to obtain a feedback current; and
      a current loop controller and a wave-maker coupled to the sample data processor and configured to:
         compensate for a reference value of the first AC voltage according to the feedback current to generate a control signal of the first AC voltage, and output the control signal to the rectifier to adjust the second value.

2. The inverter power supply system according to claim 1, wherein the inverter circuit further comprises:
   an AC power supply configured to generate the first AC voltage and the first AC current;
   the rectifier coupled to the AC power supply and configured to:
      convert the first AC voltage into a first direct current (DC) voltage; and
      convert the first AC current into a first DC current; and
   an inverter coupled to the rectifier by a first DC bus and a second DC bus and configured to:
      convert the first DC voltage into the second AC voltage; and
      convert the first DC current into the second AC current.

3. The inverter power supply system according to claim 2, wherein the feedback circuit further comprises:
   a detector coupled to the inverter circuit and configured to:
      detect a signal output by the inverter circuit; and
      output a detection result comprising the second value, wherein the determiner is configured to:
      receive the detection result from the detector; and
      determine, according to the detection result, whether the second value exceeds the preset threshold voltage.

4. The inverter power supply system according to claim 3, wherein the detection result further comprises the first value, the third value, a fourth value of a voltage of the first DC bus, and a fifth value of a voltage of the second DC bus, wherein the determiner is further configured to:
   receive the second value from the detector; and
   send, when the second value exceeds the preset threshold voltage, the enabling signal, and wherein the sample data processor is further configured to:
   receive the enabling signal from the determiner; and
   send the feedback current to the current loop controller and the wave-maker.

5. The inverter power supply system according to claim 4, wherein the reference value is obtained through calculation using a function based on differences obtained by subtracting the fourth value from a second reference value of the voltage of the first DC bus and a fifth value from a third reference value of the voltage of the second DC bus, wherein the second reference and the third reference value are preset constants, and wherein the function is an integral function or a product function.

6. The inverter power supply system according to claim 4, wherein obtaining the feedback current according to the first AC voltage, the second AC voltage, and the second AC current comprises:
   calculating an active component modulus value of the second AC voltage and the second AC current;
   performing a coordinate transformation on the first AC voltage; and
   obtaining the feedback current according to data obtained by calculating the active component modulus value of the second AC voltage and the second AC current and data obtained by performing the coordinate transformation on the first AC voltage.

7. The inverter power supply system according to claim 2, wherein the control signal is configured to adjust a value of the first DC voltage in order to adjust the second AC voltage.

8. The inverter power supply system according to claim 2, further comprising a first capacitor and a second capacitor, wherein a first end of the first capacitor is electrically connected to the first DC bus, a second end of the first capacitor is grounded, a third end of the second capacitor is connected to the second DC bus, and a fourth end of the second capacitor is grounded.

9. The inverter power supply system according to claim 2, wherein the AC power supply comprises a first output end, a second output end, a third output end, and a first common end, wherein the first AC voltage is a three-phase AC voltage comprising a first-phase AC voltage, a second-phase AC voltage, and a third-phase AC voltage having a same voltage amplitude and sequentially differing by a phase difference of 120°, wherein the first AC current is a three-phase AC current comprising a first-phase AC current, a second-phase AC current, and a third-phase AC current having a same current amplitude and sequentially different by the phase difference, wherein the first-phase AC voltage and the first-phase AC current are output through the first output end and the first common end, wherein the second-phase AC voltage and the second-phase AC current are output through the second output end and the first common end, and wherein the third-phase AC voltage and the third-phase AC current are output through the third output end and the first common end.

10. The inverter power supply system according to claim 9, further comprising:
    a first inductor comprising:
        a first end coupled to the first output end; and
        a second end electrically connected to the rectifier;
    a second inductor comprising:
        a third end coupled to the second output end; and
        a fourth end electrically connected to the rectifier; and
    a third inductor comprising:
        a fifth end coupled to the third output end; and
        a sixth end electrically connected to the rectifier, wherein the first common end is connected to the rectifier.

11. The inverter power supply system according to claim 9, further comprising:
    a first filter capacitor comprising:
        a first end electrically connected to the first output end; and
        a second end coupled to the first common end;
    a second filter capacitor comprising:
        a third end coupled to the second output end; and
        a fourth end coupled to the first common end; and
    a third filter capacitor comprising:
        a fifth end electrically connected to the third output end; and
        a sixth end coupled to the first common end.

12. The inverter power supply system according to claim 9, wherein the rectifier comprises:
    a first sub capacitor comprising:
        a first end coupled to the inverter by the first DC bus; and
        a second end coupled to the inverter by the second DC bus and coupled to the first common end;
    a second sub capacitor comprising:
        a third end coupled to the second end; and
        a fourth end;
    a first switch electrically connected to a rectifier controller in order to receive the control signal, connected between the first end and the fourth end, and connected to the first output end;
    a second switch electrically connected to the rectifier controller in order to receive the control signal, connected between the first end and the fourth end, and connected to the second output end; and
    a third switch electrically connected to the rectifier controller in order to receive the control signal, connected between the first end and the fourth end, and connected to the third output end.

13. The inverter power supply system according to claim 12, wherein the first switch comprises:
    a first sub switch comprising:
        a first control end coupled to the rectifier controller in order to receive the control signal;
        a first conduction end electrically connected to the first end; and
        a second conduction end; and
    a second sub switch comprising:
        a second control end coupled to the rectifier controller in order to receive the control signal;
        a third conduction end electrically connected to the second conduction end; and
        a fourth conduction end electrically connected to the fourth end.

14. The inverter power supply system according to claim 13, wherein the second switch comprises:
    a third sub switch comprising:
        a third control end coupled to the rectifier controller in order to receive the control signal;
        a fifth conduction end electrically connected to the first end; and
        a sixth conduction end; and
    a fourth sub switch comprising:
        a fourth control end coupled to the rectifier controller in order to receive the control signal;
        a seventh conduction end electrically connected to the sixth conduction end; and
        an eighth conduction end electrically connected to the third end.

15. The inverter power supply system according to claim 14, wherein the third switch comprises:
    a fifth sub switch comprising:
        a fifth control end electrically connected to the rectifier controller in order to receive the control signal;
        a seventh conduction end electrically connected to the first end; and
        an eighth conduction end; and
    a sixth sub switch comprising:
        a sixth control end electrically connected to the rectifier controller in order to receive the control signal;
        a ninth conduction end electrically connected to the seventh conduction end; and
        a tenth conduction end electrically connected to the fourth end.

16. The inverter power supply system according to claim 2, wherein the inverter comprises a fourth output end, a fifth output end, a sixth output end, and a second common end, wherein the inverter power supply system further comprises:
    a fourth inductor comprising:
        a first end coupled to the fourth output end; and
        a second end configured to electrically connect to a load;
    a fifth inductor comprising:
        a third end coupled to the fifth output end; and
        a fourth end configured to electrically connect to the load; and
    a sixth inductor comprising:
        a fifth end coupled to the sixth output end; and a sixth end configured to electrically connect to the load, and wherein the second common end is configured to connect to the load to output the second AC voltage and the second AC current to the load.

17. The inverter power supply system according to claim 16, further comprising:
    a fourth filter capacitor comprising:
        a seventh end coupled to the fourth output end; and
        an eighth end coupled to the second common end;
    a fifth filter capacitor comprising:
        a ninth end coupled to the fifth output end; and
        a tenth end coupled to the second common end; and
    a sixth filter capacitor comprising:
        an eleventh end coupled to the sixth output end; and
        a twelfth end coupled to the second common end.

18. The inverter power supply system according to claim 2, wherein the control signal is a pulse width modulation signal, and wherein the feedback circuit is further configured to adjust a first value of the first DC voltage by adjusting a duty cycle of the pulse width modulation signal.

19. The inverter power supply system according to claim 18, wherein the feedback circuit is further configured to reduce the duty cycle in order to reduce the first value and reduce the second value.

20. An inverter power supply system, comprising:
    an inverter circuit comprising a rectifier and configured to:
        convert a first alternating current (AC) voltage into a second AC voltage; and
        convert a first AC current into a second AC current; and
    a feedback circuit coupled to the inverter circuit and configured to:
        determine whether a second value of the second AC voltage exceeds a preset threshold; and
        perform, when the second value exceeds the preset threshold, compensation by:
            acquiring a feedback current;
            compensating for a reference value of the first AC current according to the feedback current to generate a control signal of the first AC current, and
            outputting the control signal to the rectifier to adjust the second value, wherein the feedback circuit comprises:
                a detector coupled to the inverter circuit and configured to:
                    detect a signal output by the inverter circuit; and
                    output a detection result comprising the second value, a first value of the first AC voltage, a third value of the second AC current, a fourth value of a voltage of the first DC bus, and a fifth value of a voltage of the second DC bus; and
                a rectifier controller coupled to the detector, wherein the rectifier controller comprises:
                    a determiner configured to:
                        receive the second value from the detector;
                        determine whether the second value exceeds the preset threshold; and
                        send, when the second value exceeds the preset threshold, an enabling signal;
                    a sample data processor coupled to the determiner and configured to:
                        receive the enabling signal from the determiner;
                        perform, in response to the enabling signal, a calculation on the first value, the second value, and the third value to obtain the feedback current; and
                        send the feedback current; and
                    a current loop controller and a wave-maker coupled to the sample data processor and configured to:
                        prestore the reference value; and
                        compensate for the reference value according to the feedback current to generate the control signal.

* * * * *